Dec. 25, 1951 — M. P. VORE ET AL — 2,579,632
ELECTRICAL STRAIN MEASURING APPARATUS
Filed Feb. 11, 1950 — 3 Sheets-Sheet 3

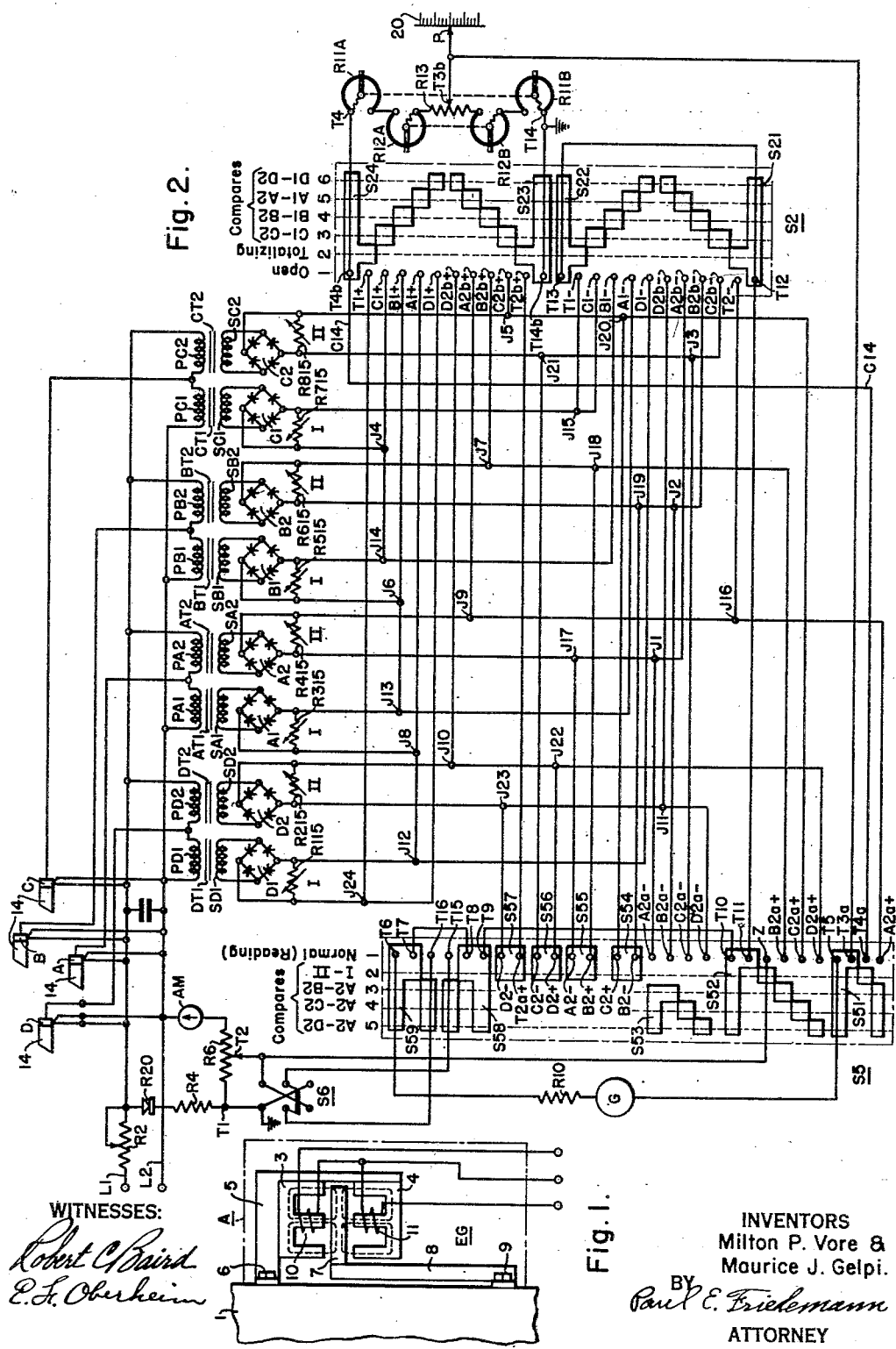

WITNESSES:
Robert C. Baird
E. F. Oberheim

INVENTORS
Milton P. Vore &
Maurice J. Gelpi.
BY Paul E. Friedemann
ATTORNEY

Patented Dec. 25, 1951

2,579,632

UNITED STATES PATENT OFFICE 2,579,632

ELECTRICAL STRAIN MEASURING APPARATUS

Milton P. Vore and Maurice J. Gelpi, Baltimore, Md., assignors to Westinghouse Electric Corporation, East Pittsburgh, Pa., a corporation of Pennsylvania Application February 11, 1950, Serial No. 143,741

5 Claims. (Cl. 73—88.5)

This invention relates generally to electrical measuring apparatus, and more in particular to such an apparatus involving a system of electric gauges.

In the weighing of heavy objects such as aircraft, it is frequently necessary to obtain a measurement of the weight within fairly close limits. In the past it has been the practice with a single weighing scale to position the scale beneath the aircraft's wheels, a wheel at a time. The relative magnitudes of the indicated weights then indicates the weight distribution while the sum of the weights serves to indicate the total weight.

However, such a practice is time consuming and since much of the computation is manual, the possibility of errors is high. This invention provides a system of a portable nature involving a plurality of electric gauge units mounted on small platforms as the platform strain detectors. These platforms may be used individually but are preferably employed simultaneously beneath the wheels of an aircraft to be subjected to the load thereof. The gauges are connected in a suitable circuit network whereby the weights may be indicated separately by a suitable switching arrangement in the circuit or the total weight represented in the sum of the gauge outputs indicated.

Alternatively, if portability of the equipment is not required, the electric gauges may be mounted at the four corners of a weighing platform to be subjected to the deflection of the platform supports at the respective points.

In general, this invention is adaptable in the measurement of a multiplicity of forces either individually or simultaneously, to selectively obtain an individual indication of the separate forces or an indication of the combined forces.

A principal object of this invention is to provide an electrical force measuring apparatus which is adaptable for measuring the algebraic sum of a multiplicity of forces or for individually indicating the forces.

It is another object of this invention to provide an electrical force measuring apparatus which is simple in its elements and positive in operation.

More specifically, it is an object of this invention to provide an electrical force measuring apparatus for use in weighing objects involving a plurality of force responsive electric gauge weighing units used to support the objects being weighed at spaced points in which means are provided responsive to the electrical outputs of the several weighing units for producing an indication of each load and/or of the sum of the loads and hence of the total weight bearing upon the weighing units.

Yet another specific object of this invention is to provide an electric gauging apparatus embodying a plurality of electric gauges responsive to load conditions at predetermined points on a structure in which means are provided for indicating the algebraic sum of the electrical changes of the electric gauges when subjected to load.

The foregoing statements are merely illustrative of the various aims and objects of this invention. Other objects and advantages will become apparent on a study of the following specification, when considered in conjunction with the accompanying drawings, in which:

Figure 1 is a schematic drawing illustrating an electric gauge of a type employable with this invention;

Fig. 2 is a diagrammatic illustration of a complete weighing equipment embodying the principles of this invention;

Figure 10:
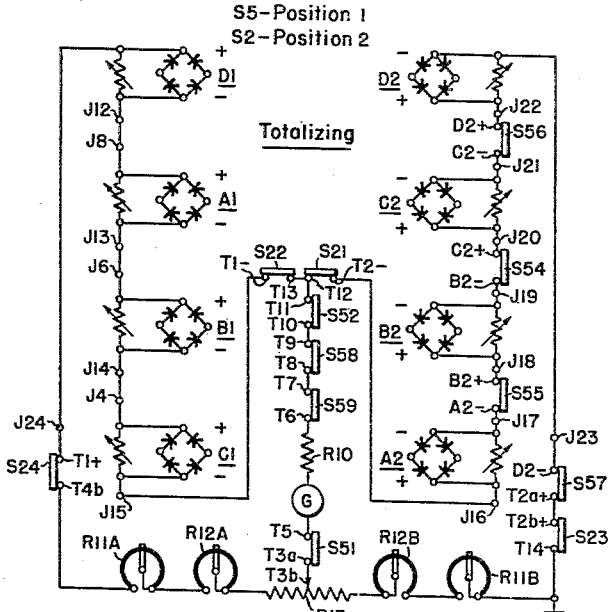

Figs. 3 through 9 diagrammatically illustrate the calibrating circuits which are established by the switching equipment and illustrated in Fig. 2; and Fig. 10 is a diagrammatic illustration of the measuring circuit whereby the outputs of the electrical gauges used in this weighing equipment may be utilized.

Referring now to Fig. 1, the electric gauge generally designated EG is of the form of a magnetic strain gauge which is securely mounted upon a member 1 which is to be subjected to a load either in tension or compression on bending or torsion. The electric gauge includes a core structure which comprises two E-shaped core members 3 and 4, respectively, which are laminated of sheets of ferromagnetic material. These E-shaped core members 3 and 4 are supported in a bracket 5 of non-magnetic material in a position such that the free extremities of the legs of the respective core sections are disposed in spaced confronting relation. The bracket 5 is securely fastened by means of a bolt 6 to a predetermined point along the strut 1. The armature member 7 of the gauge is also formed of laminated sheets of ferromagnetic material and is positioned by means of a support 8 between the confronting extremities of the E-shaped core members 3 and 4 so that small air gaps are formed therebetween. The support 8 is of the form of a bar which is fastened at one extremity at a point spaced a predetermined distance from the point of fastening of the bracket 5 along the strut 1 by means of a bolt 9 which threads into the strut. The spacing between the points of fastening of bracket 5 and support 8 along the strut 1 defines the gauge length, and the length of this gauge length for a predetermined loading of the strut 1 determines the amount of displacement of the armature 7 with respect to the core members 3 and 4. For the structure illustrated, loading of the strut 1 in compression reduces the gauge length of the strain gauge, resulting in movement of the armature 7 towards the extremities of the E-shaped core member 3 while at the same time the armature 7 is moved away from the extremities of the E-shaped core member 4 in a like amount. Since the armature member as indicated by the dotted loops in the magnetic circuit of the gauge forms part of the flux path for the magnetic flux of the gauge, relative movement of the armature member with respect to the E-shaped core members results in a decreasing reluctance of the flux path including the E-shaped core member 3 and an increasing reluctance of the flux path including the E-shaped core member 4, and this opposite change in reluctance of the separate flux paths of the gauge is usable in producing an indication of the amount of load which is placed upon the strut 1.

In accomplishing this, the central leg of each E-shaped core member is provided with a winding, winding 10 being associated with E-shaped core 3 and winding 11 being associated with E-shaped core 4. These windings are energized with alternating current, and with the armature member centrally positioned so that the reluctances of the separate flux paths are equal and assuming equal coil ampere turns, the inductance of the respective coil circuits will be the same. However, upon relative movement of the armature member with respect to the coil structure as previously described, the flux densities in the respective magnetic circuits are changed in opposite senses and the coil inductances become unbalanced. This unbalance of inductance is utilizable in obtaining an indication of the load placed upon the strut 1.

To obtain an accurate indication of the load placed upon the strut 1, it is essential that the response of the electric gauge shall be a linear function of the load which is applied to the strut. The type of gauge hereinabove described is known to have a linear response throughout the range of movement. As a consequence this type of gauge is preferred for the instant application. However, it is to be understood that other suitable gauges may also be employed in this application. If non-linearities exist in the gauge itself, it is of course feasible to calibrate the measuring circuits to compensate unwanted non-linearities in the response of the gauging equipment.

In practicing this invention, each weighing platform may comprise a flat upper surface 14. This surface will of course be suitably reinforced to carry such loads as may be placed thereon, and may be supported upon a suitable column to provide for mounting of the gauge as shown in Fig. 1. These columns or struts are not shown in the interest of simplicity. No attempt has been made to herein illustrate a practical platform since the design will depend largely upon the application. Thus it will be appreciated that a load placed upon any one of the platforms 14 will result in a corresponding compression load on the associated column or strut in an amount depending upon the force acting on the column in question. Four platforms as described would indicate the weight at each point, as the wheels of a truck. These weights are then added algebraically by the metering unit giving the total weight of the object.

Four electric gauges designated A, B, C and D, one placed in each platform, are provided for the purpose of measuring the deflection in compression of the respective columns. The basic circuit for measuring the response of the gauges to the column loads is preferably of the null balance type. This obviates the possibility of errors due to the inherent inaccuracies of meters when employed for reading of the actual meter deflection. A circuit of this general type is illustrated in Fig. 2 of United States Patent 2,434,547 which is assigned to the same assignee as this invention. In this circuit, the coils of the strain gauges are connected in series across a suitable supply of alternating current. This supply is designated by the conductors L1 and L2 of the drawings. The primaries of a pair of identical transformers are connected in series and are also connected across this supply of alternating current, and a parallel circuit is formed by connecting the point between the windings of the coils of the strain gauge to the point between the primary windings of the associated pair of transformers. With this arrangement, each gauge coil has a primary winding of a transformer connected in parallel therewith. The secondary windings of the transformers are each connected across a full-wave rectifier. The output of each rectifier is loaded by means of a suitable loading resistor, at least one of which is adjustable so that the rectifier output voltages can be made equal. The rectifiers are connected in adjacent legs of a conventional bridge circuit, the remaining two adjacent legs of which are formed by the tapped portions of a potentiometer, and a suitable indicating instrument such as a galvanometer is connected between the rectifiers on one end and to the tap of the potentiometer on the other end for the purpose of measuring the unbalance currents of the bridge circuit.

The voltage polarities of the rectifiers as they are connected into this bridge circuit are such as to be in series around the legs of the bridge. Thus when the rectifier voltages are equal and the bridge is balanced, no current flows through the galvanometer, but upon the occurrence of an unbalance in the rectifier voltages, a current flows through the galvanometer proportional to the difference in the rectifier voltages. This voltage, it will be appreciated, is an indication of the relative displacement of the armature and core section of the strain gauge which in turn is an indication of the deflection of the column, which in its turn is deflected in an amount proportional to the load applied thereto. As hereinbefore noted, a null balancing type of bridge is preferred. Hence suitable indicia calibrated in terms of platform load may be provided on a scale adjacent the tap on the bridge balancing potentiometer for the purpose of indicating on the scale the extent of movement of the tap which is necessary to rebalance the bridge, the bridge being rebalanced when the galvanometer deflection is zero, this indication on the scale will therefore be indication of platform load.

This basic circuit has been expanded in this invention, to provide for the totalizing of the outputs of a plurality of gauges, each of which is mounted in one of a plurality of platforms in the measuring circuit to thereby indicate the total load upon the weighing platforms. To this end, the strain gauge D has its windings connected in parallel respectively with the primary windings PD1 and PD2, respectively, of the transformer DT1 and DT2 to form the parallel gauge circuits hereinabove described. In a similar manner, the primary windings PA1 and PA2, respectively, of the transformers AT1 and AT2, and the primary windings PB1 and PB2, respectively, of the transformers BT1 and BT2, and primary windings PC1 and PC2, respectively, of the transformers CT1 and CT2 are respectively connected in parallel with the corresponding windings of the gauges A, B and C to form the parallel circuits hereinbefore described. All of these parallel gauge circuits are energized by the alternating-current supply of conductors L1 and L2. The secondary windings of these transformers which are respectively designated SD1, SD2, SA1, SA2, SB1, SB2, SC1 and SC2 are respectively connected across the input terminals of full-wave rectifiers D1, D2, A1, A2, B1, B2, C1 and C2, and corresponding groups of these rectifiers are connected in series in adjacent legs of a measuring bridge circuit so that the corresponding voltages are algebraically added in the adjacent legs.

The means for accomplishing this comprises a pair of drum-type switches designed S2 and S5. The switch S5 includes five operating positions. In postion 1, certain circuits are established for connecting the rectifiers in a measuring bridge circuit for the purpose of totalizing the corresponding rectifier voltages. In position 2 of switch S5, circuits are partially established for comparing the side I of each strain gauge circuit with the side II thereof. This comparison is made in the output voltages of the associated pairs of rectifiers. In this connection, the switch S2 is utilized to select the respective pairs of rectifiers which are to be so compared. This comparison through the switch S2 is accomplished in positions 3, 4, 5 and 6 thereof. In position 3 of the switch S5, provision is made for comparing the output voltage of rectifier A2 with the output voltage of rectifier B2. In position 4 of the switch S5, output voltage of rectifier A2 is compared with that of the rectifier C2, and in the last position 5 of the switch S5 the output voltage of the rectifier A2 is compared with that of the rectifier D2.

For the purpose of comparing the rectifier sections as above, the switch S2 is placed in its open position which is pistion No. 1 in which it is illustrated in the drawings. Movement of the switch S5 to position 3 completes a circuit which connects the rectifier A2 in a series loop with the rectifier B2 including the galvanometer G (see Fig. 3). This connection is such that the rectifier voltages are opposed in the series loop. At the same time provision is made for introducing a small balancing voltage to buck the predominant voltage from either of the gauges. This voltage is applied from the tap on the potentiometer R6 which is connected across the alternating current supply conductors L1 and L2 through a circuit which includes the rectifier R20, the resistor R4, the potentiometer R6 and an ammeter AM to the opposite side of the line. This circuit may be traced from the positive terminal of the rectifier A2 to the terminal A2a+ on switch segment S51 of the switch S5 to the terminal T5 on this same switch segment. The circuit then continues through the galvanometer and resistor R10 to the terminal T6 of switch segment S59 on the switch S5 to the terminal T16 on this same switch segment. From terminal T16, the circuit continues to the reversing switch S6 wherein a tapped portion of resistor R6 may be reversibly inserted into the series loop. From switch S6, the circuit continues to the terminal T15 of switch segment S58 on switch S5 to the terminal T9 on the same switch segment, and thence continues to terminal T10 on switch segment S52 to the terminal B2a+ from which the circuit continues to the positive terminal of the rectifier B2. The negative terminals of the rectifiers A2 and B2 are connected together in a circuit which may be traced from the negative terminal of the rectifier A2, to the junction point J1, to the terminal A2a— of the switch segment S53, to terminal B2a—, to junction point J2 and thence to the negative terminal of the rectifier B2 which completes the series loop. The introduction of the small bucking voltage by means of the reversing switch S6 and the potentiometer R6 makes possible the elimination of the small unbalance of the rectifier voltages. Two identical loads are placed, one on each platform associated with gauge A and B. This load causes a change in voltage ouput of A2 and B2.

Inasmuch as the rectifier A2 is being used as the standard of comparison, adjustment of the variable loading resistor R615 of the rectifier B2 is therefore made in order to balance its voltage against that of the rectifier A2 in the series loop. This procedure results in equal voltage changes at the output of A2 and B2 for the application of equal load changes and will be evidenced by no galvanometer movement as the load on platforms A and B is varied in equal amounts.

Figure 3:
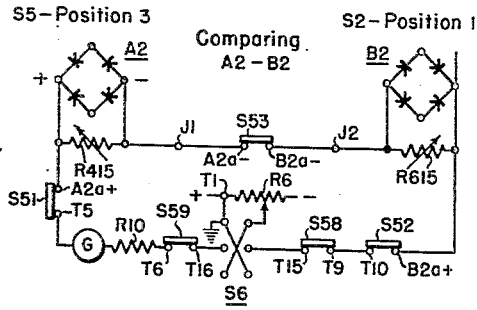
Figure 4:
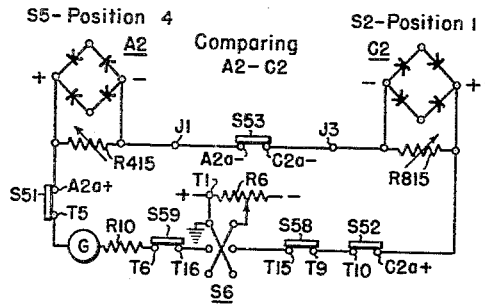

Upon completion of this comparison of rectifiers A2 and B2, the switch S5 is moved to position 4 which compares rectifier A2 with rectifier C2 in a circuit similar to that hereinabove discussed. This circuit is illustrated in Fig. 4 and is traced from the positive terminal of the rectifier A2, to the terminal A2a+ of switch segment S51, to the terminal T5 through the galvanometer G and resistor R10, to terminal T6 on the switch segment S59, to terminal T16 also on this switch segment. The circuit then continues through the reversing switch S6, to terminal T15 on switch segment S58, to terminal T9 on the same switch segment, to terminal T10 on switch segment S52, to terminal C2a+ on this same switch segment, and thence the circuit continues to the positive terminal of rectifier C2. The negative terminals of rectifiers A2 and C2 are connected together in a circuit traceable from the negative terminal of rectifier A2, to junction point J1, to terminal A2a— on switch segment S53, to the other terminal C2a— on this same switch segment to junction point J3 and thence to the negative terminal of rectifier C2 to complete the series loop. Balancing of the circuit after introduction of the small bucking voltage is accomplished in this instance by adjustment of loading resistor R815 in a manner similar to that described for A2 and B2.

Figure 5:
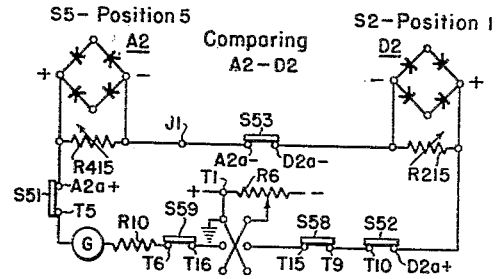

In the first position of the switch S5, which condition is illustrated in Fig. 5, the rectifier D2 is compared with rectifier A2 in a circuit traceable from the positive terminal of the rectifier A2, to the terminal A2a+ on switch segment S51, to terminal T5 on the same switch segment, through galvanometer G and resistor R10 to terminal T6 on switch segment S59, to the other terminal T16 on this switch segment, to the reversing switch S6 to the terminal T15 on switch segment S58, to terminal T9 on this switch segment, to terminal T10 on switch segment S52, to terminal D2a+ on this switch segment and thence to the positive terminal of the rectifier D2. The negative terminals of the rectifier are joined in a circuit traceable from the negative terminal of rectifier A2, to junction point J1 to terminal A2a— of switch segment S53, to terminal D2a— on this switch segment and thence to the negative terminal of the rectifier D2.

Having compared the rectifiers B2, C2 and D2 with the rectifier A2, the calibration may be completed by comparing the side I of each measuring circuit with the side II thereof. This may be accomplished by comparing the rectifier voltages, for instance the voltage of rectifier C1 with that of C2, etc. Thus for given settings of a single gauge, the voltages of corresponding rectifiers may be made equal, and since the number II sides of the networks have been compared and made equal, the entire system will then have been calibrated and ready for use.

Figure 6:
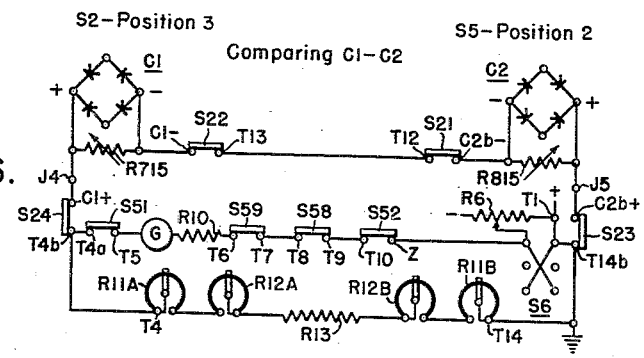
Figure 7:
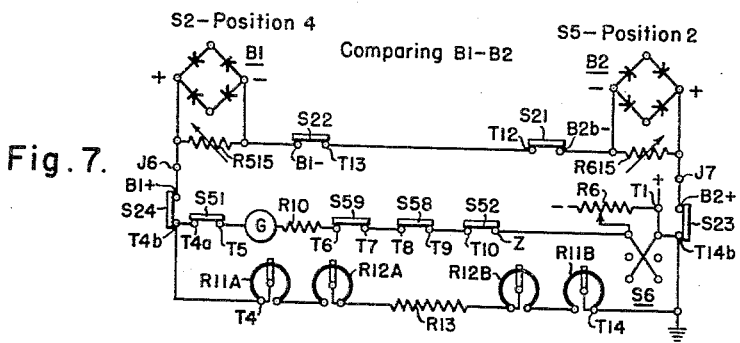
Figure 8:
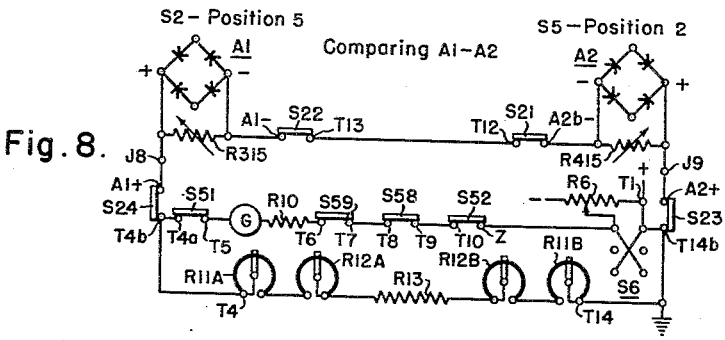
Figure 9:
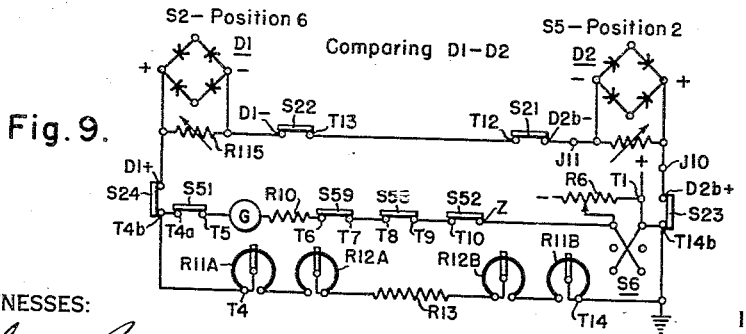

This second step in the calibration is obtained by positioning the switch S5 in its position 2 and thereafter successively positioning the switch S2 in its positions 3 through 6. In position 3, as illustrated in Fig. 6, the rectifier C1 is connected in a series loop with the rectifier C2, the rectifier voltages being opposed in this loop. In position 4, the circuit includes the rectifiers B1 and B2 in opposition in the series loop. This is illustrated in Fig. 7. In Fig. 8, in position 5 of S2, rectifiers A1 and A2 are compared, and in Fig. 9, position 6 of switch S2 forms a loop circuit in which the rectifiers D1 and D2 are compared.

Returning now to Fig. 6 and also to Fig. 2, it should be noted that the measuring circuit in which the rectifiers are connected includes a potentiometer circuit in which the units of matched pairs of potentiometers are connected on opposite sides of the null balancing potentiometer R13. These potentiometers and the null balancing potentiometers are connected in series circuit relation and the units of one pair are designated R11A and R11B, the movable taps of which are connected mechanically as indicated by the dotted line. Units R12A and R12B are also mechanically ganged as shown by the dotted lines so that the taps thereof are moved simultaneously. The pair of potentiometers R11A and R11B are arranged so that upon actuation of the mechanical connection, for instance clockwise as viewed in Fig. 2. The resistance of the potentiometer R11A is decreased while that of the potentiometer R11B is increased. In the case of the remaining potentiometers R12A and R12B, the electrical connections are such that upon movement of the mechanical connection therebetween, the resistances of these potentiometers change in the same direction, that is, the resistances increase or decrease simultaneously. With an arrangement such as this, the upper and lower ends of the indicating scale 20 are conveniently adjusted. In the following sequence of tests, R11A, 11B, 12A, 12B and R13 are left in fixed positions throughout.

In position 3 of switch S2 and position 2 of switch S5, the circuit connecting the rectifiers C1 and C2 in opposition across the potentiometer circuit may be traced from the terminal T4 on one end of potentiometer R11A to terminal T4b on switch segment S24, through the switch segment S24 to the terminal C1+, on this switch segment to junction point J4, and thence to the positive terminal of the rectifier C1. From the negative terminal of rectifier C1, the circuit continues to terminal C1— on switch segment S22, to the terminal T13 on this switch segment, to terminal T12 on switch segment S21, to terminal C2b— on this same switch segment and thence to the negative side of the rectifier C2. From the positive side of rectifier C2, the circuit continues to junction point J5, to terminal C2b+ on switch segment S23, to terminal T14b on this switch segment and thence to the terminal T14 on the end of potentiometer R11B which completes the series loop including the potentiometer circuit. It will be noted that rectifiers C1 and C2 are connected in voltage opposition in this circuit. The galvanometer G is connected across the potentiometer circuit between terminals T4b and T14 in a circuit which is traceable from terminal T4b over conductor C14, to terminal T4a on switch segment S51 of the switch S5, to terminal T5 on switch segment S51, through the galvanometer G and resistor R10 to terminal T6 on switch segment S53, to terminal T7 on this switch segment, to terminal T8 on switch segment S53, to terminal T9 on this switch segment, to terminal T10 on switch segment S52, to terminal Z on this switch segment. The circuit continues through the tapped portion of potentiometer R6 which is grounded on the side of terminal T1 (see Fig. 2). Inasmuch as the circuit connecting with the terminal T15b at the potentiometer R11B is grounded (see Fig. 2), it will be appreciated that the galvanometer circuit is completed across the potentiometer circuit through ground and this completed circuit is shown in Figs. 6 through 9. The balancing voltage which is tapped from resistor R6 is applied in the galvanometer circuit in opposition to the voltage of the rectifier C1 and the reversing switch S6 is not employed for the purpose of switching the polarity of this voltage. A load is now placed on the platform supported by column C after the artificial zero is set through R6. R715 is then changed until the galvanometer reads zero. Thus the comparison of C1 to C2 is complete since any load on platform C produces equal voltage changes in C1 and C2.

This is done for A, B, C and D platforms and since the "II" sides of each were previously set and the "I" sides are now adjusted to meet them, both sides of all gauges are matched.

In Fig. 7, the calibrating circuit for the rectifiers B1 and B2 is traceable from the terminal T4 at potentiometer R11A to terminal T4b on switch segment S24, through switch segment S24 to the terminal B1+ which is connected to switch segment S24 in the number 4 position of the switch S2. The circuit continues to junction point J6 and thence to the positive terminal of the rectifier B1. From the negative terminal of rectifier B1 the circuit continues to terminal B1— on switch segment S22, to terminal T13 on this switch segment, to terminal T12 on switch segment S21, to terminal B2b— on this switch segment and thence to the negative side of rectifier B2. From the positive side of rectifier B2, the circuit is traced to junction point J7 to terminal B2b+ of switch segment S23, to terminal T14b on this switch segment, to terminal T14 at the end of potentiometer R11B. The galvanometer circuit is connected across the potentiometer circuit in exactly the same manner as described in Fig. 6.

In Fig. 8, illustrating the number 5 position of the switch S2, the calibrating circuit for the rectifiers A1 and A2 is traced from the terminal T4 at potentiometer R11A, to terminal T4b on switch segment S24, to terminal A1+ on this switch segment, to junction point J8 and thence to the positive side of rectifier A1. From the negative side of rectifier A1 the circuit continues to terminal A1— on switch segment S22, to terminal T13 on this switch segment, to terminal T12 on switch segment S21, to terminal A2b— on this switch segment and thence to the negative side of rectifier A2. From the positive side of rectifier A2, the circuit is traced to junction point J9, to terminal A2b+ on switch segment S23, to terminal T14b on this switch segment, to terminal T14 on potentiometer R11B to complete the loop circuit. The galvanometer circuit is again traced as described in Fig. 6.

In position 6 of the switch S2, the calibrating circuit for rectifiers D1 and D2 is traced from terminal T4 at potentiometer R11A, to terminal T4b on switch segment S24, to terminal D1+ on this switch segment and thence to the positive side of rectifier D1. From the negative side of rectifier D1, the circuit continues to D1— on switch segment S22, to terminal T13 on this switch segment, to terminal T12 on switch segment S21, to terminal D2b— on this switch segment, to junction point J1 and thence to the negative side of rectifier D2. From the positive side of rectifier D2, the circuit continues to junction point J10, to terminal D2b+ on switch segment S23, to terminal T14b on this switch segment and thence to terminal T14 on potentiometer R11B to complete the loop circuit. Again the galvanometer circuit is the same as that traced in Fig. 6.

For establishing the totalizing circuits to indicate the algebraic sum of the voltages of the corresponding rectifiers in the measuring system, the switch S5 is placed in position 1 and the switch S2 moved to position 2 which is its totalizing position. In this position of the switches, as shown in Fig. 10, the rectifiers D1, A1, B1, C1 are connected in series in one leg of the measuring bridge circuit. The rectifiers D2, C2, B2 and A2 are connected in series in an adjacent leg of the measuring bridge circuit, the remaining two adjacent legs of which are determined by the tapped portions of the potentiometer circuit including the potentiometers R11A, R12A, R13, R12B and R11B. In this connection of the rectifiers, the rectifier voltages are in series around the legs of the bridge circuit and the galvanometer circuit is connected across the galvanometer terminals of the bridge between the negative terminal of rectifier C1 and the positive terminal of rectifier A2 on one side and to the tap T3 of potentiometer R13 on the other side. Tracing this circuit around the legs of the measuring bridge circuit and beginning at the positive terminal of rectifier D1, the circuit continues to junction point J24, to terminal T1+ of switch segment S24, to terminal T4b on this switch segment, to terminal T4 of potentiometer R11A, through potentiometer R11A, through potentiometer R12A, through potentiometer R13, through potentiometer R12B, through potentiometer R11B, to terminal T14b on switch segment S23, to terminal T2b+ on this switch segment, to terminal T2a+ on switch segment S57, to terminal D2— on this same switch segment, to junction point J23 and thence to the negative side of rectifier D2. From the positive side of rectifier D2, the circuit continues to junction J22, to terminal D2+ on switch segment S56, to terminal C2— on this switch segment, to junction point J21 and thence to the negative side of rectifier C2. From the positive side of rectifier C2, the circuit is traceable to junction point J20, to terminal C2+ of switch segment S54, to terminal B2— on this switch segment, to junction point J19 and thence to the negative side of rectifier B2. From the positive side of rectifier B2, the circuit continues to junction point J18, to terminal B2+ on switch segment S55, to terminal A2— on this switch segment, to junction point J17 and thence to the negative side of rectifier A2. From the positive side of rectifier A2, the circuit continues to junction point J16, to terminal T2— on switch segment S21, to terminal T12 on this switch segment, to terminal T13 on switch segment S22, to terminal T1— on this switch segment, to junction point J15 and thence to the negative side of rectifier C1. From the positive side of rectifier C1 the circuit continues to junction point J4, to junction point J14 and to the negative side of rectifier B1. From the positive side of rectifier B1 the circuit continues to junction point J6, to junction point J13 and to the negative side of rectifier A1. From the positive side of rectifier A1 the circuit continues to junction point J8, to junction point J12 and to the negative side of rectifier D1 which completes the path around the legs of the bridge circuit.

The galvanometer circuit is traceable from terminal T12 on switch segment S21, to terminal T11 on switch segment S52, to terminal T10 on this switch segment, to terminal T9 on switch segment S58, to terminal T8 on this switch segment, to terminal T7 on switch segment S59, to terminal T6 on this switch segment through resistor R10 and galvanometer G to terminal T5 on switch segment S51, to terminal T3a on this switch segment and to terminal or tap T3b on potentiometer R13. By reference to Fig. 10, it will be noted that the voltages of the corresponding rectifiers are in series in their respective legs of the bridge circuit and that the total voltage of the rectifiers is in series around the legs of the bridge circuit. Thus it will be appreciated that with the bridge 11 balanced, equal total rectifier voltages in the adjacent rectifier legs of the bridge result in zero current flow through the galvanometer circuit, but upon the occurrence of an unbalance of the voltages in the adjacent legs of the bridge, a voltage is impressed across the galvanometer circuit having a current which is proportional to the magnitude of the voltage unbalance. Since this voltage unbalance as previously noted is a linear function of the load placed upon the weighing platform 14, it will be appreciated that the galvanometer will be energized by a current which is proportional to the load being measured. To obviate the inherent inaccuracies of a deflection type of measuring system, the tap of the potentiometer R13 is adjusted to restore the bridge circuit to a balanced condition. In so doing, the pointer P is moved along the scale 20 which may be conveniently calibrated in pounds and therefore indication read directly from the scale gives the actual weight in pounds of the load supported on the weighing platform 14. This direct reading is done by setting R11A, R11B for zero and R12A, R12B for a definite reading of dial 20 on R13 when some definite load is applied to the platforms.

While but one embodiment of this invention has been illustrated, it will be appreciated by those skilled in the art that numerous variations in details as well as application of the disclosed subject matter may be made without departing from the spirit and scope of this invention. It is, therefore, intended that the foregoing disclosure and the showings made in the drawings shall be considered only as illustrative of the the principles of this invention and not construed in a limiting sense.

We claim as our invention:

1. Apparatus responsive to the sum of the strains of at least two elements subject to stress comprising, in combination, at least two electric strain gauges, one for each of said elements; means securing said electric strain gauges to respond to the stress of the corresponding one of said elements, each of said strain gauges comprising a pair of electrical circuits and means responsive to the strain of its element for controlling the electrical characteristics of the circuits, said circuits being electrically balanced for a given strain in the corresponding element and being unbalanced by the strain responsive means upon the occurrence of strain in its element different from the given strain, unidirectional voltage producing means connected with each electrical circuit of each electric strain gauge, the unidirectional voltage producing means for each gauge producing opposed voltages, a bridge circuit including corresponding unidirectional voltage producing means of each electric strain gauge in series in adjacent legs thereof, and circuit means responsive to the unbalance of said bridge circuit.

2. Apparatus responsive to the sum of the strains of at least two elements comprising, in combination, at least a pair of electric gauges one for each element, each having a pair of electric circuits, means forming a part of each electric gauge responsive to the strain of the corresponding element for oppositely varying the electrical characteristics of the associated pair of electric circuits, circuit means for energizing the electric circuits, rectifier means connected with each electric circuit of each electric gauge for producing unidirectional voltages varying in dependence of the change in electrical characteristic of the associated electric circuit, the pair of rectifiers connected with each electric gauge producing opposed voltages, circuit means connecting the corresponding rectifier means of each electric gauge in series forming a pair of series rectifier circuits having opposed voltages, a bridge circuit including the pair of series rectifier circuits in adjacent legs, and circuit means responsive to the electrical output of the bridge circuit.

3. In combination, at least two electric gauges, each having a pair of coils and a movable armature for oppositely varying the coil voltages, circuit means for supplying alternating current to the coils of each electric gauge, a rectifier connected across each coil of each electric gauge, the rectifiers connected across the coils of each electric gauge producing opposed voltages, circuit means connecting the corresponding rectifiers of each electric gauge in series forming two series connected rectifier circuits, a bridge circuit including the series connected rectifier circuits in adjacent legs, and circuit means responsive to the electrical output of the bridge circuit.

4. In an electric gauge system, the combination of, a plurality of alternating-current electric gauges, each having a pair of opposed alternating-current output circuits; a plurality of rectifiers, one connected with each alternating current output circuit, first circuit means connecting corresponding rectifiers in series circuit relation so that half the total number of rectifiers are connected in series in said first circuit means, second circuit means connecting the remaining rectifiers in series circuit relation, and circuit means responsive to the difference of voltage of the first and second circuit means.

5. In an electric gauge system, the combination of, a plurality of alternating-current electric gauges, each having a pair of opposed alternating-current output circuits; a plurality of rectifiers one connected with each alternating-current output circuit, first circuit means connecting corresponding rectifiers in series circuit relation so that half the total number of rectifiers are connected in series in said first circuit means, second circuit means connecting the remaining rectifiers in series circuit relation, an electrical bridge circuit including said first and said second circuit means in adjacent legs thereof, and circuit means responsive to the electrical unbalance of said bridge circuit.

MILTON P. VORE.
MAURICE J. GELPI.

REFERENCES CITED

The following references are of record in the file of this patent:

UNITED STATES PATENTS

| Number | Name | Date |
|---|---|---|
| 2,421,626 | Kuehni | June 3, 1947 |
| 2,443,098 | Dean | June 8, 1948 |
| 2,470,069 | Davies | May 10, 1949 |
| 2,478,720 | Sourwine et al. | Aug. 9, 1949 |
| 2,540,807 | Berry | Feb. 6, 1951 |